Nov. 27, 1934.  J. EHRLICH  1,981,910
FRICTION TRANSMISSION
Filed Dec. 18, 1929   6 Sheets—Sheet 2
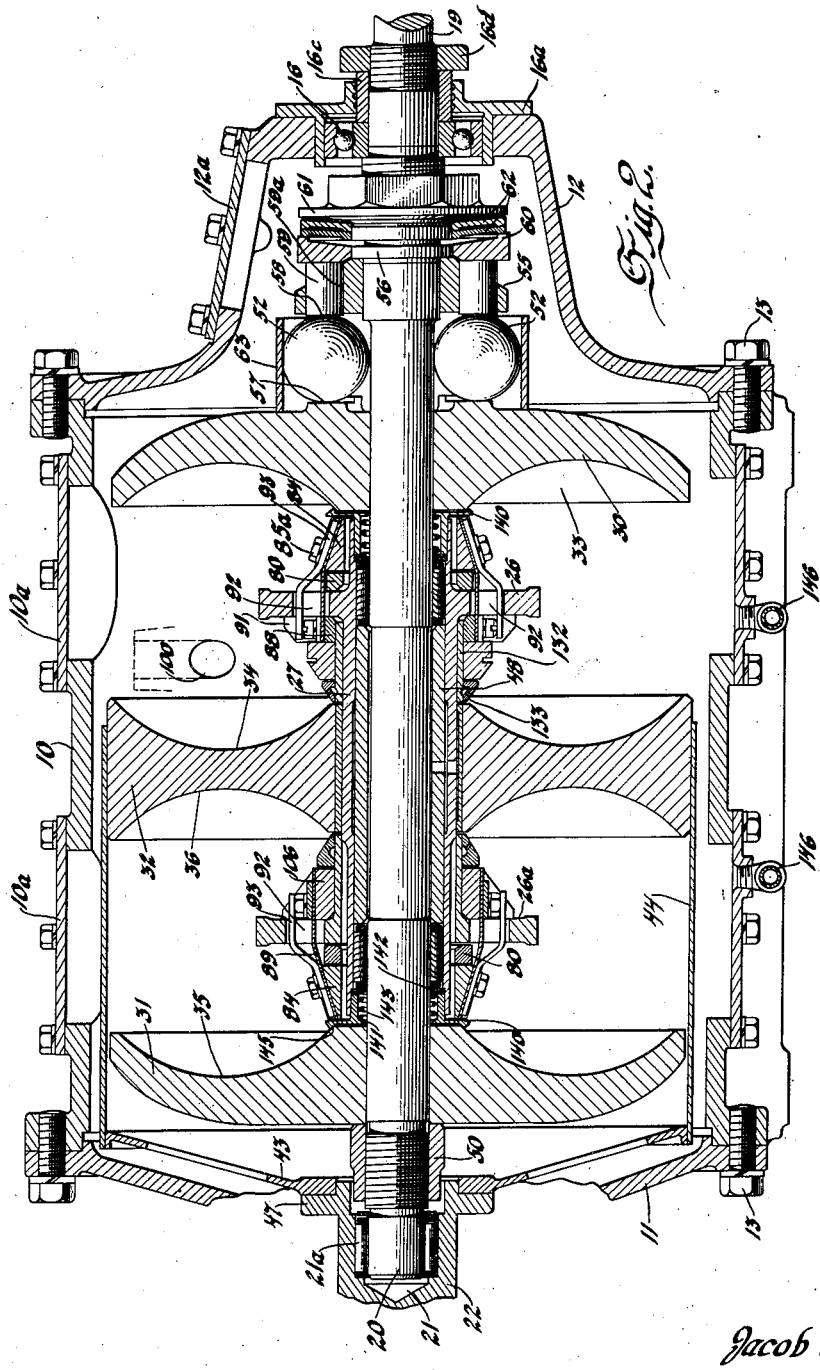
Inventor
Jacob Ehrlich
By Blackmore, Spencer & Kick—
Attorneys

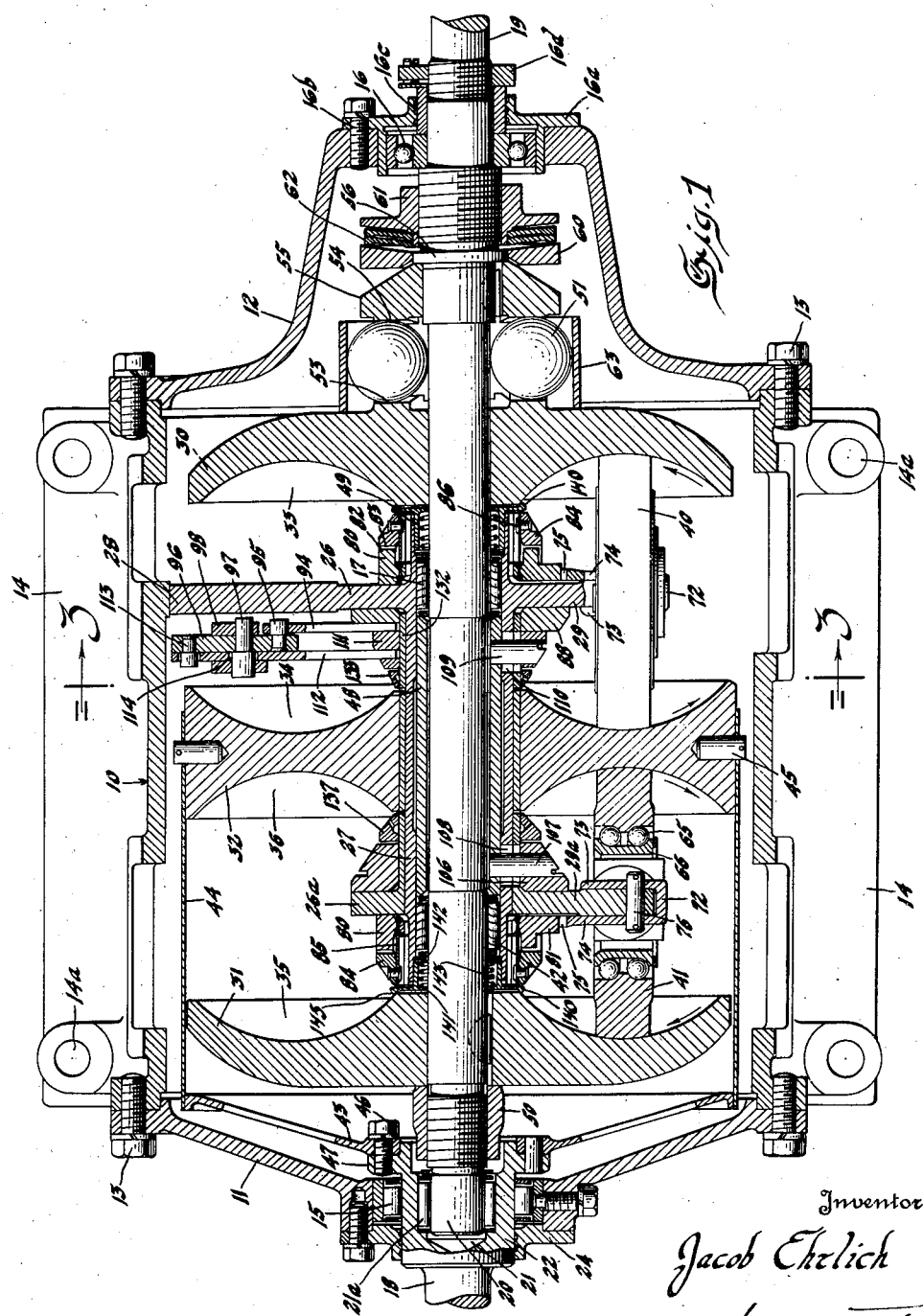

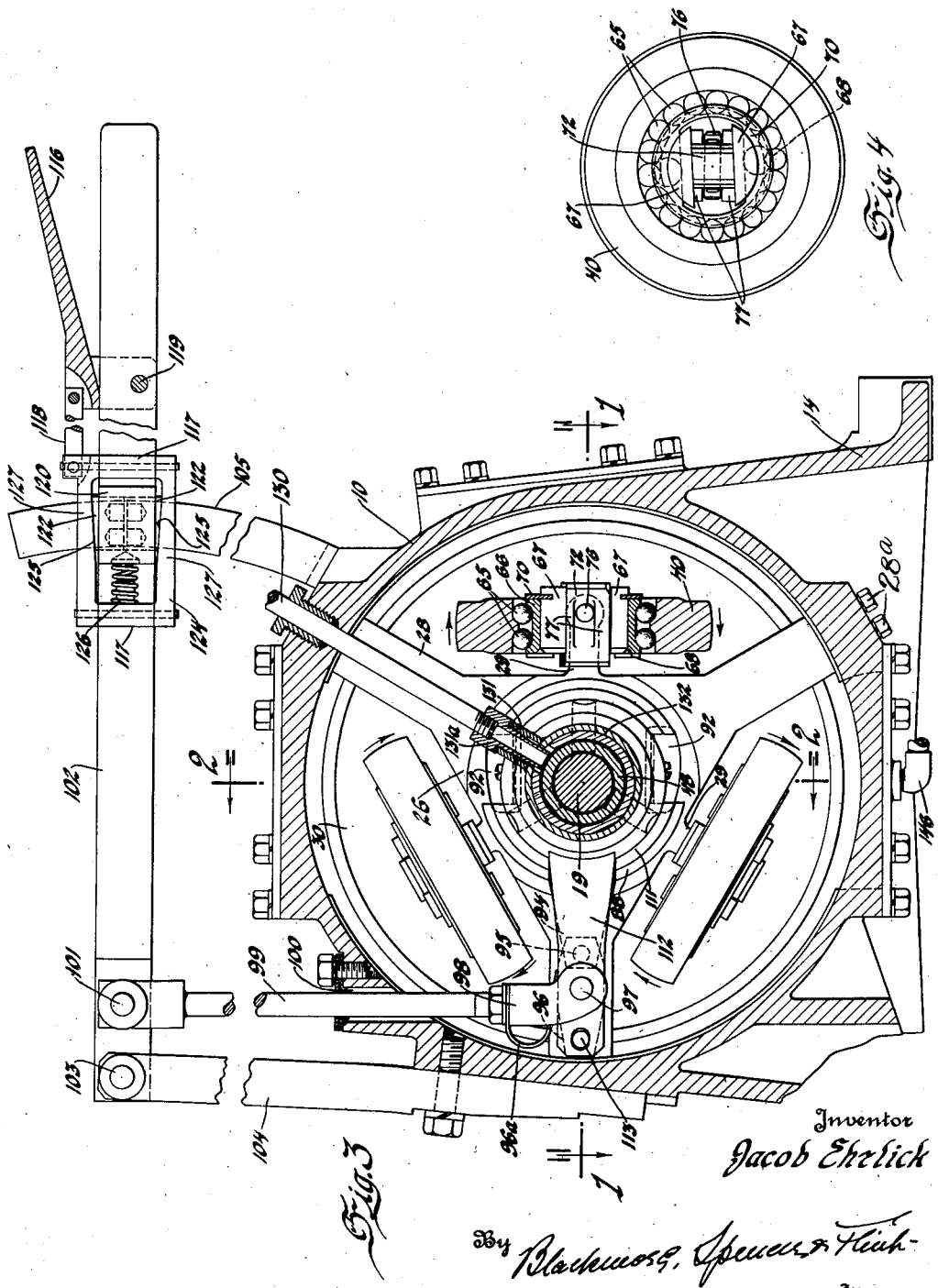

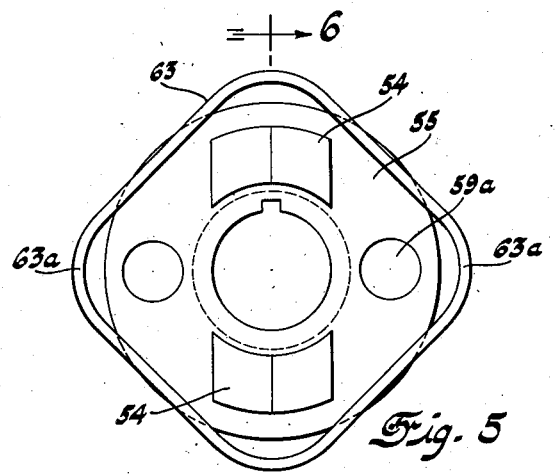
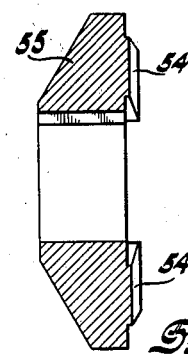
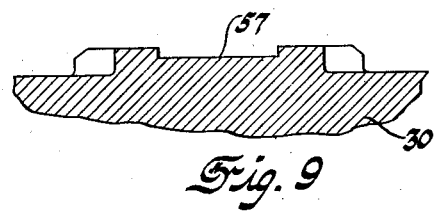
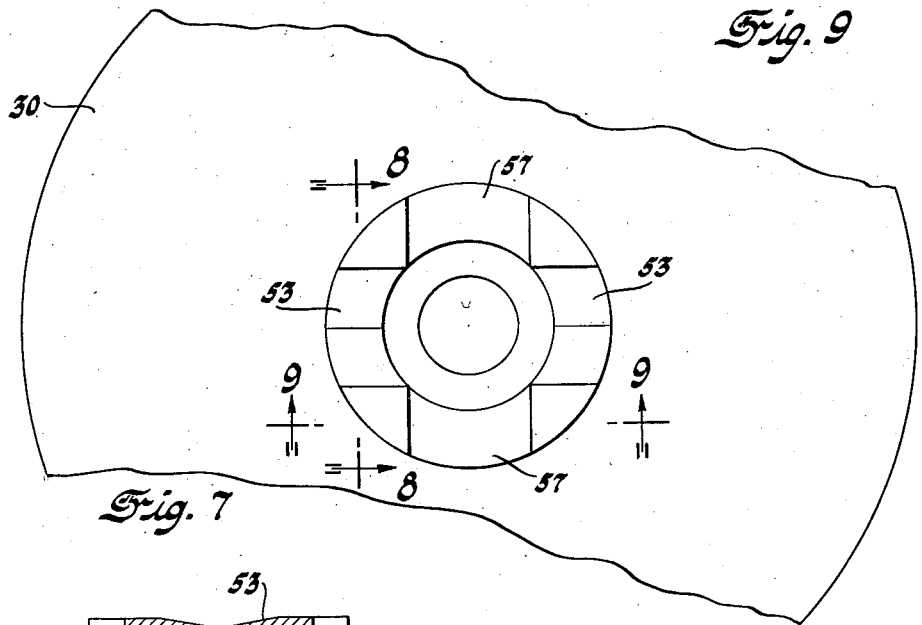
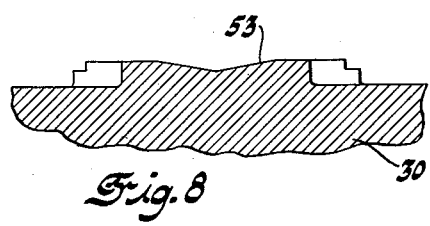

Nov. 27, 1934.  J. EHRLICH  1,981,910
FRICTION TRANSMISSION
Filed Dec. 18, 1929   6 Sheets-Sheet 5

Inventor
Jacob Ehrlich

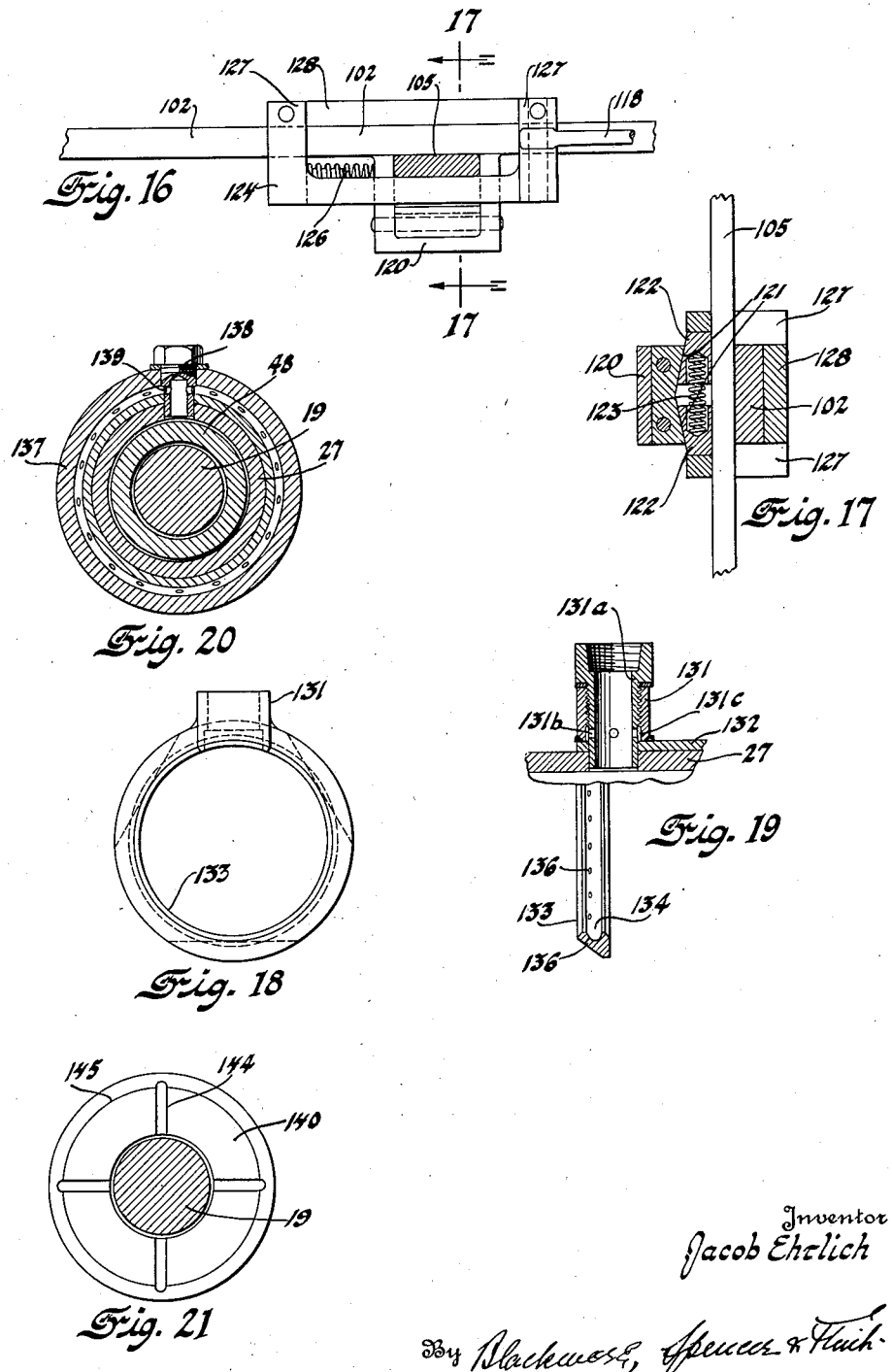

Patented Nov. 27, 1934

1,981,910

UNITED STATES PATENT OFFICE 1,981,910

FRICTION TRANSMISSION

Jacob Ehrlich, Detroit, Mich., assignor, by mesne assignments, to General Motors Corporation, Detroit, Mich., a corporation of Delaware Application December 18, 1929, Serial No. 414,899

28 Claims. (Cl. 74—200)

The invention herein disclosed pertains to mechanical power transmission mechanism capable of communicating rotary movement from a driving member to a driven member at any relative speed within the limits of variation incident to a particular machine design,—as distinguished from those transmission mechanisms which are susceptible of a definite number only of step by step changes.

The invention includes a transmission train with friction driving and driven members, susceptible of different relative velocities, engaged by intermediate friction rollers the positions of which may be changed while the transmission is operating so as to change the relative velocities of said driving and driven members.

In the embodiment specifically described herein there are two disk-like members attached to an assumed driven shaft and an intermediate double surfaced disk-like member connected to an assumed driving shaft in axial alinement with the first named shaft. The assumed driving and driven shafts may, however, be reversed in function. The driving and driven members, hereinafter designated races, have opposed toric surfaces, hereinafter called race ways, engaged by two series of relatively balanced rollers having spheroidal traction surfaces. Torque is, therefore, transmitted from driving shaft to driven shaft by a double surfaced driving race,—the equivalent of two rigidly connected races,—two driven races and two parallel series of transmission rollers, giving rise to the problems of causing the two series of idler transmission rollers and each individual roller to share equally in the load. In order to distribute the load equally means have been provided for automatically adjusting the rollers of the two series and the individual rollers of each series with respect one to another in such manner as to secure the results desired.

To change the speed ratio it is necessary to change the angle between the axis common to the driving and driven races (the main axis) and the axes of the rollers in a plane substantially including both. The movement to effect this change is hereinafter designated a "tilting" movement or "tilt." To do this directly it would be necessary to compel the traction surfaces of the rollers to slide on the race ways. This would require a very considerable force, as relatively high pressures are needed to obtain traction when the load is heavy, and, if possible, would result in wear. In accordance with this invention the tilting movement is obtained indirectly by rocking each roller in a plane transverse of the axis of the driving and driven races, preferably about an axis slightly outside in a radial direction of the line joining their points of contact of the rollers with the race ways; whereupon the forces inherent in the rotating disks and rollers cause the rollers to assume a new speed ratio relation. Said rocking movement requires the application of very little force and is hereinafter designated the "inclining" movement.

The rollers are inclined by means of a train of speed ratio control elements extending therefrom to a main control lever which may, for example, be locked to and released from a segment by a friction locking device, thus permitting infinite gradations of locked positions within the range permitted.

An inclining of the rollers as described to effect indirectly tilting, or new speed ratio relation, inclines the roller axes with respect to planes which include normally the main axis and the roller centers and imparts to the rollers a tendency to trace spiral paths on the races,—a tendency that would continue unless counteracted. Therefore a "return" device is utilized in the form of oblique parallel surfaces on one member of each roller supporting axle, which afford a tilting axis slightly inclined with respect to a plane normal to the main axis in a plane normal to the axis of rotation of the roller and, in response to the tilting movement, effects restoration of each roller axis into said plane that normally includes the main axis and roller center, thus avoiding the necessity of the operator's trying to stop the spiraling of the rollers by manipulating the main control lever.

To avoid oscillations of the rollers about their positions of equilibrium, especially at low speeds, stabilizing springs and damping means have been interposed in their train of mechanism by which the speed ratio is controlled.

In order to obtain the minimum traction between the friction races and rollers for a given load upon the output shaft a minimum elastic or equivalent pressure tending to force the races and rollers into contact is applied by a yieldable device exerting a predetermined amount of pressure, while a torque loading device is provided for increasing said pressure in response to increase of load or resistance to rotation of the output shaft.

Although lubrication may be accomplished in many ways, a force feed system is disclosed herein whereby oil may be forcibly flowed and sprayed to or upon the relatively moving juxtaposed surfaces of the disks and rollers continually during operation of the mechanism. Spray rings and distributors are provided for applying oil to the inner zones of the race ways of the revolving disks.

The accompanying drawings, in which like reference characters indicate like parts throughout the several views, illustrate one specific embodiment of the invention. In said drawings:

Fig. 1 is a longitudinal section substantially in a plane indicated by the line 1—1 of Fig. 3;

Fig. 2 is a longitudinal section, substantially in a plane at right angles to the plane of Fig. 1, taken on line 2—2 of Fig. 3; but omitting intermediate transmission rollers;

Fig. 3 is a transverse section substantially on line 3—3 of Fig. 1 (but showing one intermediate roller in section);

Fig. 4 is a detail face view of one of the intermediate transmission rollers with its trunnion and associated parts;

Fig. 5 is a detail of a torque pressure member and pressure-sphere retainer, viewed toward the pressure face of the member.

Fig. 6 is a section through the torque pressure member on line 6—6 of Fig. 5;

Fig. 7 is a fragmentary view of the rear of the race shown at the right of Figs. 1 and 2;

Figure 11:
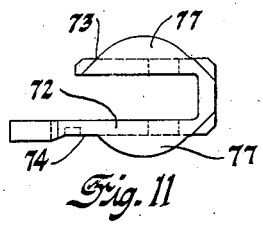
Figure 10:
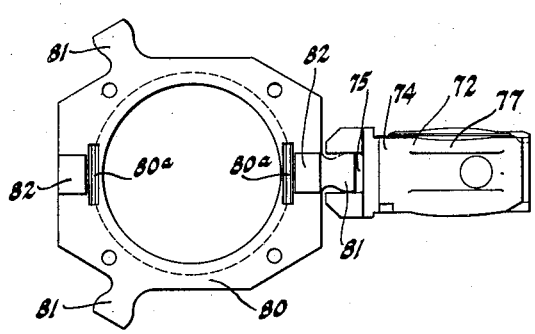
Figure 12:
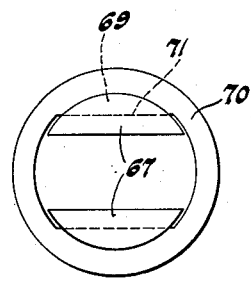
Figure 13:
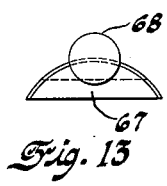
Figure 14:
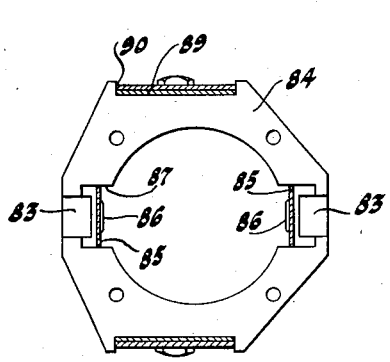
Figure 15:
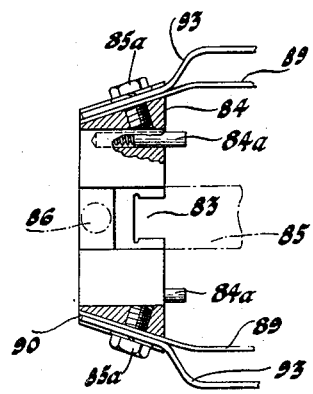

Figs. 8 and 9 are detail fragmentary cross sectional views taken on lines 8—8 and 9—9, respectively, of Fig. 7;

Fig. 10 is a detail showing one of the equalizer rings and one of the transmission roller ratio control levers engaged;

Fig. 11 is a plan of one of the transmission roller ratio control levers;

Figs. 12 and 13 are details of the transmission roller axle blocks;

Figs. 14 and 15 are a face view and section, respectively, of one of the neutralizing rings;

Fig. 16 is a plan view of the means for locking the main control lever;

Fig. 17 is a section taken on line 17—17 of Fig. 16;

Fig. 18 is a detail of an oil spray ring for lubricating one race way of the driving race;

Fig. 19 is a fragmentary section showing the oil spray ring illustrated in Fig. 18 with details of associated parts;

Fig. 20 is a section through a second oil spray ring for lubricating the other race way of the driving race, and Fig. 21 is a face view of one of the oil distributors for directing oil to the end races.

Referring to Figs. 1, 2 and 3: Numeral 10 indicates the main body of a transmission housing having opposite open ends covered by closures 11 and 12 removably secured as by bolts 13. Conventional means of fixing the housing to a supporting base or frame are shown as flanges 14 having bolt holes 14a. The housing is equipped with bearings 15 and 16, shown as of anti-friction type, disposed centrally in closures 11 and 12. In the illustrated construction the bearing 15 in closure 11 receives the delivery end of a race-carrying shaft herein considered as the driving shaft; bearing 16 receives the race-carrying driven shaft, which also has one end received in a socket in the driving shaft. Closure 11 is therefore at the power input end of the transmission housing and closure 12 at the power output end. The alined coincidental axes of races, driving and driven shafts constitute the main axis of the transmission. Suitable openings in the housing for affording access to the interior and for facilitating inspection are illustrated as closed by removable cover plates 10a and 12a.

The transmission shafting essential to the invention comprises a shaft 18, deemed to be the driving shaft, which may be rotated by any suitable prime mover, and a shaft 19, deemed to be the driven shaft, in axial alinement with the driving shaft. One end of the driven shaft (as shown at the left in Figs. 1 and 2) may have a slightly reduced end 20 journaled in a socket 21 formed in the contiguous end of the driving shaft illustrated as enlarged at 22, said enlarged end being supported preferably by rollers within said bearing 15 in the power input end of the housing; an anti-friction bearing for reduced end 20 of the driven shaft may be provided within socket 21 by rollers 21a, and a removable annulus 24 may be bolted to the closure 11 for the purpose of aiding to position the rollers of bearing 15 and to retain lubricant. In a central opening in output end closure 12, bearing 16, shown as a ball bearing, is assembled within a flanged bearing holder 16a bolted to the closure at 16b. The races of the ball bearing 16 may be positioned axially with respect to the shaft 19 and locked against a shoulder thereon by thrust bushing 16c controlled by a lock nut 16d threaded on the shaft. This bearing construction allows shaft 19 and the bearing races, thus longitudinally fixed thereto, to slide axially a limited extent within the flanged holder 16a and hence, also, to move axially with respect to the housing and parts fixed to it.

Driving shaft 18 imparts driving torque to a double faced disk or race 32, free to rotate about the axis of driven shaft 19. Torque is transmitted from disk or race 32 to disks or races 30 and 31, mounted to rotate with shaft 19, by intermediate transmission rollers 40 and 41. With disks or races and rollers positioned as illustrated driving and driven shafts will rotate in opposite directions at the same speed.

In Figs. 1 and 3 a transverse support 26 is shown rigidly united to the housing by means of which and parts rigidly connected to it the rollers 40 and 41 are positioned and maintained with their center points in substantially fixed relation with respect to the main axis and housing. Support 26 is shown as a spider having equally spaced radiating long arms 28 the ends of which are secured to housing 10 as by bolts 28a. Short radiating arms 29, rigid with the spider, are spaced equally between the long arms. Said short arms 29 serve to position intermediate transmission rollers 40 in a manner to be hereafter described. The spider 26 is welded to or otherwise made rigid with a long hub or torque tube 27 near one end—the right hand end as shown in Figs. 1 and 2. Pinned to or otherwise made rigid with the torque tube near its opposite end is a second spider 26a provided with short radiating arms 29a equally spaced angularly in the same radial planes with respect to the main axis as the short arms 29 of spider 26. Arms 29a serve to position intermediate transmission rollers 41. The positioning arms are shown as three in number on each spider, equally spaced angularly, with the corresponding arms of each spider in the same radial plane. Thus the intermediate rollers will be symmetrically disposed around the axis of the driving and driven shafts and balanced with respect to one another. Bearing rollers 17 are interposed between torque tube 27 and shaft 19 adjacent spider 26; other bearing rollers 42 are interposed between the torque tube and shaft adjacent spider 26a. Shaft 19 may therefore rotate freely within the torque tube.

A spacing tube 48, constituting also an element of speed ratio control mechanism, is interposed between said bearing rollers 17 and 42. Said rollers are spaced from the end races 30 and 31 by short spacing tubes which in the illustrated form of the invention are tubular hubs 49 of oil spray distributors hereinafter described. Sufficient spacing is provided between bearing rollers and spacing tubes 49 to permit slight movement of approach, one toward the other, of said spacing tubes. The length of torque tube 27 is such as to allow races 30 and 31 slight movement of approach one toward another. Spacing and control tube 48 is capable of oscillating within torque tube 27 for the purpose of transmitting control movement to intermediate transmission rollers 41 in a manner to be described.

The two driven races 30 and 31, are connected to driven shaft 19 in such manner as to compel said shaft to rotate with them but to permit relative axial movement of one race toward the other for purposes of adjustment as will presently appear. Double race way driving race 32, interposed between the driven races, is rotatable freely around the axis of shaft 19, being journaled, as illustrated, on torque tube 27. Opposed toric grooves 33 and 34, of similar dimensions, occur in the opposing faces of races 30 and 32, respectively; similar grooves 35 and 36 occur in the opposing faces of races 31 and 32, respectively. Said toric grooves function as bearing and traction surfaces or race ways for said two series of intermediate transmission rollers 40 and 41 which have spheroidal traction surfaces and are positioned by said shorter radial arms 29 and 29a of the spiders 26 and 26a so as to bear on the toric surfaces 33, 34, 35 and 36. Intermediate race 32 is secured to driving shaft 18 by means of the conoidal flange or spider 43 and the rigid connecting member 44, which may be a cylinder, extending from said spider to said race 32 and surrounding but quite free from race 31. In the embodiment illustrated driving pins 45 serve as driving connections between member 44 and race 32. Said member 44 may be welded or otherwise fixed to spider 43, and the latter may be bolted, as at 46, to a flange 47 on the torque delivering enlarged end 22 of the driving shaft.

Race 31 may be keyed to shaft 19 as shown in Fig. 1 and prevented from moving thereon toward the end 20 by a collar 50, preferably adjustably secured to the shaft. Race 30 is free on shaft 19 except as it is compelled to move axially on it and rotate with it by means herein called spring and torque loading devices whereby a predetermined axial thrust is applied at all times and a thrust proportional to the torque delivered is automatically applied between shaft 19 and race 30, tending to cause races 30 and 31 to approach one another and the intermediate driving race 32.

The torque loading device now preferred consists of a plurality of hard spheres or other rolling bodies 51—two, as shown. Spheres 51, spaced 180° apart, are interposed between V-shaped camming surfaces 53 on the race 30 and opposing V-shaped camming surfaces 54 formed on one face of a pressure member 55 keyed on shaft 19 against a collar 56 and so disposed with respect to the spheres and one another that relative rotation of shaft and race tends to effect powerful relative axial-direction movement in opposite senses. Fig. 1 illustrates spheres 51 and their relation to pressure member 55 and race 30. As illustrated in Fig. 2, spheres or other rolling bodies 52 spaced 180° apart, but 90° from spheres 51, bear at one side on plane surfaces 57 on the rear of race 30, and at the other side on plane surfaces 58 formed on the ends of pins 59 carried in holes 59a in said pressure member 55, the axes of the pins and holes being substantially parallel with the main axis. Pins 59 are elastically biased toward race 30 since their rear ends (toward the output end) bear against an abutment, shown in Figs. 1 and 2 as an axially movable collar 60, between which and a collar 61 fixed on shaft 19 is disposed an elastic resistance shown as a pair of dished spring washers 62 of the type commonly known as Belleville washers. The fixed collar 61 may be adjustable axially on the shaft so that springs 62 can be assembled under compression whereby they are capable of exerting a constant precalculated pressure tending to produce adequate tractive contact between the raceways and the bearing surfaces of the intermediate transmission rollers.

By disposing spheres 52 between parallel plane surfaces on the race 30 and pins 59, the effect of a ball thrust bearing is obtained—allowing free relative rotative movement of race and shaft within the range permissible and prompt response of the torque loading device to increases of load.

The pressure exerting spheres 51 and 52 are held from escaping radially by a polygonal retainer 63 the included circle of which is of less diameter than that of pressure member 55. The retainer illustrated is a band of generally square contour but having rounded corners 63a (Fig. 5) within which the spheres are disposed. The parallel sides of the retainer are spaced apart a distance less than the diameter of pressure member 55 and the retainer is therefore prevented from becoming displaced in the power delivery direction by said pressure member. The spheres cannot escape circumferentially because of the cam elevations necessary to enable the spheres to apply torque to the race,—the distances between the elevated parts of the cams and the opposing surfaces are less than the diameters of the spheres. The slopes of the sides of the V-grooves or other camming surfaces and the elastic characteristics of the spring washers 62 are so chosen as to give at any transmission ratio the lowest contact pressure between races and rollers that is possible without dropping at any ratio below the pressure necessary for traction.

Intermediate transmission rollers 40 and 41, which have been stated to be positioned between races 30 and 32, and 31 and 32 respectively, by spider arms 29 and 29a, are of annular form having spheroidal peripheries curved on a radius equal to or somewhat less than the radius of the curve of the toric raceways in a radial plane including the axis of the races. The inner periphery of each annular roller preferably engages balls 65 interposed between it and an annular bearing race 66.

In order to vary the speed ratio of the driving and driven shafts, intermediate transmission rollers 40 and 41 must be caused to tilt, by which is here meant to change the angular position of their axes in radial planes including the main axis of the transmission. In so tilting, if the peripheries of the intermediate rollers are caused to engage the central driving race 32 on circular paths nearer the main axis than paths where they engage the driven races 30 and 31, the speed of the driven shaft relative to the speed of the driving shaft obviously will be lower than that obtained when the peripheries of the intermediate rollers engage the driving and driven races at paths equidistant from said axis as shown in the drawings. Conversely, if the paths of engagement of said rollers with the driving race are farther from said axis than the paths of their engagement with the driven races, the speed of the driven shaft will be greater than that of the driving shaft.

To enable the speed ratio to be varied bearing rings 66 are mounted on the arms 29 and 29a by means of compound axle elements now to be described:

Snugly fitted within each bearing ring 66 are two diametrically opposed axle blocks 67. These axle blocks 67 are of parti-cylindrical contour,—as if sliced from a cylinder on planes parallel with the axis and each other. A block-locating member 68 is rigid with each axle block at its inner end, projecting beyond the curved surface as illustrated. They are shown in the drawings as flat disks welded to the ends of the blocks. When assembled within the bearing ring 66, members 68 serve to position blocks 67 with their inner ends substantially flush with the inner face of the bearing ring. The opposite end of each block 67 is kerfed as at 69 to receive a second locating member, shown in the form of a flat ring 70 having opposed internal segments 71 bounded by straight parallel edges (chords of a circle) seated in the kerfs of opposite axle blocks with its inner face in contact with the bearing ring 66,—thereby assisting to hold the two blocks in proper relative position with respect to each other and to the bearing ring.

Each of the intermediate transmission rollers 40 and 41, with its appropriate fixed bearing ring 66 and axle blocks, is fitted over an axle element consisting of a speed ratio control lever 72 of U-form having spaced parallel limbs 73 and 74 of unequal length of which 74 is the longer and has a substantially rectangular notch 75 adapted to be engaged by one of several lugs of a multiple-lugged actuator 80 herein designated an "equalizing ring" (see Figs. 1, 2, 3, 4 and 10). The limbs of each ratio control lever 72 embrace snugly the sides of a spider arm 29 or 29a (according to which of the two series of transmission rollers it is used with) and is fulcrumed on said spider arm near its outer end by pin 76.

Opposite faces of lever 72 transverse of the spider-embracing surfaces are parallel and oblique to a plane including the fulcrum axis (axis of pin 76) cutting the lever lengthwise,—a plane which, in the 1:1 ratio condition shown in the drawings, is a radial plane including the main axis and axis of rotation of the intermediate transmission roller. The obliquity of said opposite faces may be approximately 5° (measured in a plane perpendicular to the plane that includes the main axis and the roller center and parallel to the main axis) in the exemplary embodiment as indicated in detail Fig. 4. Opposite blocks 67 have their flat surfaces bearing lengthwise on said oblique faces of lever 72; and to provide area of bearing surfaces adequate to prevent cocking of the blocks each limb of the lever arm 72 may have outward-bulging flanges 77 having surfaces co-planar with and constituting part of said oblique bearing faces. Thus provision is made for tilting each roller 40 and 41 about an axis which is inclined with respect to a plane normal to the main axis in a plane which is normal to the axis of rotation of the roller. Inclination of the axis of tilt of the roller established by the oblique surfaces on ratio control lever 72 as described provides for returning the roller axis into said radial plane in response to the tilting movement of the rollers initiated by inclining the axis out of the radial plane; this constitutes the return device referred to hereinbefore. It is not claimed of itself in this application as it is the joint invention of myself and another.

As illustrated in Figs. 1 and 3, the fulcrum of ratio control lever 72 (axis of pin 76) does not coincide with or lie in the center plane normal to the axis of rotation of the transmission roller controlled by it, but is disposed outward therefrom measured from the main axis, i. e. the fulcrum of each lever 72 is outward of the center of curvature of the race ways in a radial plane. From the disposition of each transmission roller and the elements constituting its axle and connection to the spider arm that positions it, as described, it will be apparent that a rocking or inclining movement imparted to ratio control lever 72 in a plane normal to the main axis will forcibly incline the roller similarly, that is, will incline the axis of rotation so that if extended it will pass to one side of the main axis instead of intersecting it; and also that this inclination may be imparted by the application of very little force since the roller pivots substantially on its points of surface contact with the opposite toric raceways in races 30 and 32, or 31 and 32, as the case may be and may roll easily on said raceways during the very slight displacement effected. The roller, however, is free to "tilt" about an axis slightly inclined with respect to the perpendicular to the plane that includes the main axis and the center of the roller, i. e. its axis of rotation may freely turn so as to assume positions at various angles to the main axis,—blocks 67 then rotating on and in the planes of the oblique faces of the particular ratio control lever 72. The blocks 67 are also free to slide on said oblique faces longitudinally with respect to the ratio control lever.

The inclining movement referred to is designed to be imparted to the intermediate transmission rollers manually. The tilting movement referred to follows automatically from the relations thus brought about between the intermediate transmission rollers and the driving and driven races. The oblique surfaces on which the rollers tilt automatically check the tilting movement, restoring the rollers in their newly assumed speed ratio position to the position in which the axis of rotation intersects the main axis, which is necessary in order that the inherent forces which control the tilting of the rollers may continue in equilibrium.

The rocking movements of ratio control levers 72 about the pin 76 in spider arms 29, 29a, to effect inclination of intermediate transmission rollers 40 and 41 in planes transverse of the main axis, may be imparted by a main control lever 102, shown in Fig. 3, which is adapted to operate in unison two trains of link and lever control mechanisms extending in parallel from the main lever to the two series of ratio control levers 72, which control, respectively, the two series of intermediate transmission rollers 40 and 41. By operating said lever 102 all transmission rollers, therefore, are urged to incline simultaneously.

Each of the two trains of link and lever mechanisms referred to by which the lever arms 72 are rocked for the purpose of inclining the intermediate transmission rollers 40 and 41 will be traced backward to the main operating lever common to both trains.

Considering first the train for inclining the rollers 40 illustrated at the right of Fig. 1 and in Fig. 3:

A ring-like operating member 80 (Figs. 1, 2 and 10) having a plurality of radiating lugs 81—three in number if there are three rollers in the series as illustrated—is sleeved over the torque tube 27 close to and on the power output side of spider 26 as illustrated in Figs. 1, and 2. The orifice through ring-like member 80 is substantially larger in diameter than that portion of the torque tube over which it is sleeved. Member 80 is therefore capable not only of oscillating around the main axis, but also of moving crosswise with respect to said axis in any direction. This member 80 may be designated a floating "equalizing ring". Lugs 81 of the equalizing ring have convexly curved edges and engage within the described notches 75 of speed ratio control levers 72. In the normal relative positions of equalizing ring 80 and speed ratio levers 72, room is provided for movement of an equalizing ring lug 81 lengthwise of lever 72. The equalizing ring is also provided with diametrically spaced lugs 82 jutting from the face removed from contact with spider 26 in a direction parallel with the axis.

Referring to Figs. 1, 2, 10 and 14: Lugs 82 on equalizing ring 80 engage corresponding diametrical grooves 83 formed in a floating ring 84 herein designated a "neutralizing ring". Neutralizing ring 84 is sleeved over torque tube 27 so that it also may both rotate and move transversely with respect to the main axis, as shown at the right of spider 26, Figs. 1 and 2. Diametrically opposite flat springs 85, each having one end riveted as at 86 in an internal groove 87 of the neutralizing ring, extend into slots 80a in equalizing ring 80. The springs are disposed so that torque applied to neutralizing ring 84 is transmitted edgewise of the springs to equalizing ring 80. Loosely interlocking lugs and grooves 82 and 83 are not essential but insure torque compelling connection between the said rings even though springs 85 should break or otherwise give way.

Referring now to Figs. 2, 14 and 15: Neutralizing ring 84 is connected to a control ring 88 (journaled on sleeve 132 surrounding the torque tube) by flat springs 89 arranged 180° apart but 90° from springs 85. Springs 89 are clamped at one end in external notches 90 formed in neutralizing ring 84, and at the other end in notches 91 in control ring 88. Springs 89 pass through openings 92 in spider 26 which allow rotative movement of the parts to which said springs are secured sufficient to effect control. Plates 93 secured to neutralizing ring 84 by bolts 85a serve as clamps for springs 89 and also project through the openings 92 into notches 91 of control ring 88. Said plates are not essential but function in the same manner as said coacting lugs and notches 82 and 83 on equalizing and neutralizing rings, respectively, to hold the control ring and neutralizing ring in the same angular relation in case springs 89 should give way.

Spring pressed pins 84a are seated in holes drilled into that face of neutralizing ring 84 which is adjacent to equalizing ring 80. The neutralizing ring is held against movement away from the spider by the anchorage of springs 89 to control ring 88, which bears against the spider 26 on the opposite side. Spring pressed pins 84a function to press, yieldingly, floating equalizing ring 80 against the adjacent face of spider 26 to dampen any vibration that may be set up in said equalizing ring or parts movable by or with it.

It will be perceived that rotation of control ring 88 will rotate neutralizing ring 84 by means of spring and plate connections 89 and 93; and that rotation of neutralizing ring 84 will rotate equalizing ring 80 by means of its spring, lug and notch connections which, in turn, will impart rocking or inclining movement to ratio control levers 72, acting to incline rollers 40 in planes transverse of the main axis. It will also be perceived that springs 85 and 89, respectively arranged on diameters separated 90°, supplemented by plates 93 engaging notches 91 on one of said diameters, and by lugs 82 engaging notches 83 on the other, enable ring 80 to "float", or become laterally displaced with respect to control ring 88 and the main axis without disturbing the capability of the control ring to rotate said equalizing ring. The parts described function as a so-called Oldham coupling; but the parts of the coupling illustrated are spring biased to a normal concentric position with respect to the main axis by the flat springs, which also transmit torque.

Control ring 88 has an arm 94 rigid with it. The end of arm 94 is pivoted at 95 to an equalizer bar 96 (Figs. 1 and 3). Said equalizer bar is pivoted by pin 97 between the limbs of the forked end 98 of rod or link 99 which passes through a suitably packed opening 100 in the housing 10, and is joined at 101 to the main control lever 102 fulcrumed at 103 on a support 104 secured to the exterior of the housing. Main control lever is held in any adjusted position by means of a friction-lock,—to be later described,—engaging with a segment 105.

Tracing now the link and lever train from the other series of intermediate transmission rollers, 41, to the main control lever 102, it will be seen upon reference to the left hand portions of Figs. 1 and 2 that another floating equalizing ring 80 having lugs 81 engages other speed ratio controlling levers 72 for said series of rollers 41, and that another floating neutralizing ring 84 is connected to said equalizing ring 80 and to a control ring 106 by flat springs and couplings identical with those described in the parallel transmission for controlling rollers 40. Spider 29a is perforated as is spider 29 to permit the passage of springs 89 and plate 93. Except for their reversed position the control elements for rollers 41 are thus far the same as for rollers 40. Secondary control ring 106 is pinned to spacing tube 48 by pins 107, said pins passing through orifice 108 formed in torque tube 27 and hub of spider 26a, said orifice being of such size and form as to permit the needful rotary movement of the control ring to occur. A second pin or pins 109 passing through another suitable opening 110 in torque tube 27 connects tube 48 to another or primary control ring 111 to which an arm 112 is rigidly attached. The outer end of arm 112 is pivoted at 113 to equalizing bar 96 at the end opposite to that to which arm 94 is pivoted. Thus pin 97 by which the equalizing bar is attached to rod 99 lies between the pivotal connections thereto of arms 94 and 112; and the connections are such that the ratio of length of arm 94 to length of arm 112, measured from the main axis, is the same as the ratio of length of the short arm of the equalizing bar to its long arm—that is, as the distance from axis of pin 95 to that of pin 97 is to the distance from axis of pin 113 to the axis of pin 97. In Figs. 1 and 3 it will be seen that lever 112 as well as equalizer bar 96, is embraced by the limbs of fork 98,—also that lever arm 112 is provided with a perforation 114 sufficiently large to allow free passage of pin 97 and permit slight relative angular movement of arm 112 with respect to arm 94. The orifice in the end of lever arm 112 also is made a little larger than the pin 113 which engages in it in order to compensate for the different arcs of movement of the connected lever arm and equalizer bar. A curved leaf spring 96a secured within the fork 98 of rod 99 bears frictionally on the equalizer bar in such a manner as to bias the equalizer bar toward a position in which the axes of the pins 95, 97 and 113 and the main axis lie in the same radial plane.

Main control lever 102, in the illustrated embodiment, is designed to be operated by hand and, as before stated, to be locked to and unlocked from the segment 105 by means of a friction locking device. The friction locking device is manually releasable by movement toward the main lever of a thumb lever 116 pivoted to the main lever at 119. It is automatically locked by elastic or equivalent devices effective when the thumb lever is free from pressure. The locking device (Figs. 3, 16 and 17) comprises a U-shaped guide and lock retaining bracket 120 rigid with main lever 102, through which the segment 105 passes, said segment guiding the movements of said main lever and constituting a rigid member, fixed to the housing, to which said lever may be locked. Said U-shaped bracket has reversely inclined surfaces 121 (Fig. 17) adapted to be engaged by locking wedges 122 forced into locking position by springs 123 and adapted then to cam said wedges against the segment 105. The locking device also comprises a wedge releasing slider 124 on the main lever connected by a link 118 to the thumb lever and provided with opposite inclined surfaces 125 arranged to engage the wedges and push them from locking position when the thumb lever is manipulated. A spring 126 tends to move the slider in a direction to allow the wedges to lock while movement of the thumb lever toward the main lever overcomes the spring pressure and causes the slider to unlock the wedges. In the form illustrated slider 124 is composed of five rigidly united parts,—two members of shallow U-form the two limbs 127 of one disposed across one edge of lever 102, and the two limbs of the other disposed across the opposite edge; a guide plate 128 is secured to and between the ends of limbs 127 of both shallow U-members, contacting with that side of the main lever which is opposite the lock bracket 120; two end spacer blocks 117 uniting and spacing the two U-formed members of the slider on the side opposite guide plate 128. Segment 105 intervenes between main lever 102 and the bases of the U-shaped members of the slider. The inclined surfaces are on the inner opposed faces of the base parts of said U-shaped members and contact with the narrow ends of wedges 122. Spring 126 is disposed and reacts between one side of the lock bracket 120 and one of the spacer blocks 117 of the slider.

Lubrication may be effected by forced circulation, the oil flowing (from the pressure side of any suitable lubricating pump, not shown,) into oil tube 130 which discharges between torque tube 27 and spacing tube 48 whence it distributes through suitable grooves, spaces and orifices to parts needing lubrication (see Figs. 3, 18, 19 and 20). Intake oil tube 130 connects with a nipple 131 rigid with sleeve or bushing 132 surrounding the torque tube 27 between spider 26 and center race 32. A coupling 131a extends through the nipple and has holes 131b discharging into an annular space 131c. Bushing 132 and torque tube 27 are provided with registering holes into which coupling 131a fits to admit oil into the space between shaft 19 and torque tube. Nipple 131 is also attached to an oil spray ring 133 surrounding said bushing. The spray ring 133 lies adjacent one face of race 32 (the right hand face as shown in Figs. 1 and 2). The ring is provided with an annular internal oil groove 134 communicating with annular space 131c and an external beveled face next to the race. A series of oblique perforations 136 extending from the beveled face to the internal oil groove permits oil to spray out onto the race. A second spray ring 137 disposed adjacent the other face (the left hand face in the drawings), of construction similar to that of the spray ring 133, distributes oil upon said other face of race 32. Said second spray ring 137 surrounds a sleeve projecting from spider 26a. The inner oil groove in said ring receives oil forced from the space between torque tube and shaft through a hollow screw 138 which connects said ring, sleeve and torque tube together and communicates with the space inside the torque tube. Hollow screw 138 has radial perforations 139 communicating with the inner annular oil groove of the ring whence oil escapes through the oblique perforations in the ring onto the race 32.

Oil is distributively applied to the end races by oil spray distributors 140 which are preferably integral with the spacing tube 49 before mentioned. Spray distributors 140 are disk-like bodies from which tubes 49 project axially. Each tube 49 is internally flanged as at 141. Between said internal flange and a stop ring 142 is a coil spring 143 tending to force the spray distributor against the adjacent race. The face of distributor 140 that is juxtaposed to race 30 or 31, as the case may be, is provided with radiating oil grooves 144 extending to the inner edge of the race way in the adjacent race. Said disk-like distributor is also provided with a small flange 145 extending slightly into the race way at the outer ends of the oil groove 144, whereby oil will be directed into the race way.

Oil which drips and sprays from the transmission collects in sumps in the lower side of the housing chamber and thence passes into the oil circulating system through pipes 146.

Operation

It is desirable to have the prime mover (not shown) running uniformly at its most economical rate of speed and to vary the output speed by changing the transmission ratio.

Assuming torque to have been applied to shaft 18, as by an internal combustion engine, central driving race 32 will be rotated with shaft 18 at the same speed. Rotation will be imparted by the central driving race to the two driven races 30 and 31, through the two series of intermediate idler rollers 40 and 41 acting in parallel. As shaft 19 must rotate with races 30 and 31 it rotates in a sense opposite to that of driving shaft 18. Normal tractive contact between the races and intermediate rollers is obtained by pressure of the spring loading devices 52, 59, 60, 62 and 61, reacting between the driven shaft and driven race 30. As the load or resistance torque on the driven shaft increases, torque loading devices 51, 53, 54 and 55, increase the pressure and traction between races and rollers.

The intermediate idler transmission rollers are illustrated in a position in which continuations of their axes of rotation intersect and are perpendicular to the main transmission axis extending longitudinally through the centers of driving and driven shafts and races. Consequently all the points or lines of contact between rollers and races are equidistant from the main axis and the speed ratio of driving to driven shaft is 1:1.

Assuming that driving shaft and driving race rotate clockwise (viewed from the left of Fig. 1) driven races and driven shaft of course will rotate counter clockwise viewed from the same observation point. In order to increase the speed of driven shaft (output speed) with respect to that of the driving shaft it will be necessary to tilt the rollers 40 and 41 in planes that include their axes of rotation and the main axis in such directions that their peripheries will contact with driving race 32 farther from its center and with driven races 30 and 31 nearer to their centers; that is, rollers 40 and 41 must be tilted in opposite senses. To accomplish this tilting movement for the purpose of imparting increased speed to the driven shaft with respect to the speed of the driving shaft, main control lever 102 should be moved downward from its position shown in Fig. 3. Downward movement of main lever 102 pushes rod or link 99 downward rocking control rings 88 and 111 counter clockwise (as viewed from the left of Figs. 1 and 2), and also the entire control train extending from said control rings to and including the floating equalizing rings 80 of both series of intermediate idler rollers. Lugs 81 of the equalizer rings, engaging ratio control levers as described, rock those levers on pins 76 in a clockwise direction and consequently rock or incline all of the rollers of both series in a clockwise direction as indicated by the arrow adjacent rollers 40 in Fig. 3 thus inclining or bringing the roller axes of rotation into a position where they point to one side of the main axis instead of intersecting it. Inspection of Figs. 1 and 3 will make it evident that the rollers when so inclined will trace spiral paths on the driving and driven races. The paths on the driving race will be expanding spirals and those on the driven races contracting spirals, resulting in tilting the rollers in the senses indicated by the arrows adjacent the rollers in Fig. 1. The pitch of said spirals will obviously vary in proportion to the degree of inclination of said ratio control levers. To decrease the speed of the driven shaft with respect to the driving shaft, ratio control levers 72 and the attached rollers should, of course, be inclined in the direction opposite that described for increasing the relative speed of the driven shaft.

During the spiraling of the intermediate idler rollers on the races the continuations of the axes of said rollers do not intersect the main axis of the transmission—the axis of driven shaft 19—but pass to one side or the other according to whether ratio control levers have been inclined in a direction to increase or decrease output speed. It will be clear that the axes of said rollers must be restored to positions in which continuations of said axes do intersect said main axis, before the forces acting on them through the races will be in equilibrium so as to maintain said rollers tracking in circular paths on the races. This stabilizing of rollers after speed changes might be done perhaps by manipulation of the main control lever 102; but it would be extremely difficult, if possible, and would require a highly skilled hand. Means for returning the axes of the rollers to the main-axis-intersecting position have been described, namely, the inclined axis enforced by the oblique faces on ratio control levers 72 on which the roller trunnion blocks rotate while the rollers are tilting to vary speed ratio. By inspection of Fig. 4 it will be seen that the oblique faces on ratio control levers belonging to series of rollers 40 incline downward from right to left. When, therefore, lever 72 has been inclined clockwise as described the axis of a roller 40 controlled by it will be moved so that its extension passes to one side of the main axis—in Fig. 1, above it. Now as the roller "tilts"—in the sense indicated by the small arrows in Fig. 1—the axis will return to the plane containing the roller center and main axis. The line of the roller axis again intersects said main axis. The oblique faces of ratio control levers for rollers 41 are inclined reversely since the drive from the driving race is opposite; but of course the inclination is the same relative to senses of movement.

Should it from any cause happen that the idler rollers of one series become so tilted as to transmit speed at a different ratio than the idler rollers of the other series, correction will be made automatically in the control train. As the rollers 40 and 41 are not supported to rock about their centers in the inclining movements, but about the pins 76 disposed radially outward from their centers, the traction forces, that is the driving forces of the driving race and the reaction forces of the driven race, which are applied to the rollers in the same direction, will produce a torque tending to incline the rollers (in planes transverse of the main axis). This torque is resisted by the ratio control levers and the trains of control devices extending through equalizing rings, neutralizing rings, springs, coupling pins, control rings, and lever arms 94, 112 to equalizer bar 96. If the rollers of both series are positioned in the same speed ratio relation to the races, the torque reaction on lever arms 94 and 112 will be equal; consequently the equalizer bar 96 will be in equilibrium. Should the ratio relation of the two series not be equal the torque reaction on lever arms 94 and 112 will be unequal and will cause equalizing bar 96 to rock,—permitting the arms 94 and 112 to move in opposite senses. Hence rollers 40 and 41 will be inclined in opposite directions which will cause their ratios to be changed oppositely until both series carry the same amount of torque.

Should any roller of one series happen to vary its ratio with respect to the others of the series the floating ring 80 will restore equilibrium. As long as torque reactions of the rollers of one series are equal ring 80 will float in central position—with its axis coincident with the main axis. Should it happen that one roller of a series, for example, gets into a position where it is tilted to a higher speed ratio than the others and therefore carries all of the load, the traction forces described will incline the ratio control lever 72 and roller mounted on it. The movement of lever 72 will displace floating equalizing ring 80 bodily transversely of the main axis—it cannot rotate it. This bodily transverse movement of the equalizing ring will tilt the other ratio control levers of the series in the opposite sense with the result that the proper ratio change of the several rollers will be made until equilibrium is restored.

It has been ascertained both analytically and empirically that spring or equivalent means are desirable to maintain the idler rollers in their mean position of equilibrium particularly during low speeds. Otherwise oscillations of the rollers with respect to their position of equilibrium may occur. Likewise spring or equivalent means tending to maintain one series of rollers in equilibrium with the other series are desirable.

Leaf springs 85 and 89 which connect the control rings, neutralizing rings and floating equalizing rings tend to maintain the equalizing rings centralized and therefore the individual rollers of a series in their positions of equilibrium.

Leaf spring 96a tends to keep the equalizer bar 96 in its mean position and hence, through the connections therefrom to the equalizer rings, to maintain the latter in the same relative angular position and thus keep the rollers of one series in the same speed ratio relation as the rollers of the other series.

Spring pressed friction pins 84a, which press the floating equalizing rings 80 against the spiders dampen oscillations and thus supplement and hasten the action of the springs in bringing the rollers quickly in to a state in which each roller of a series carries an equal share of the load. The frictional engagement of spring 96a on equalizer bar 96 has a similar damping action with respect to the series.

Although the damping means specifically described and illustrated are solid bodies rubbing one against another, other forms of damping means may be used; and, although some form of damping is deemed necessary to control oscillation, as described, the springs described may in some cases be omitted, as the gyroscopic forces developed in the system are the equilvalent of springs in stabilizing effect.

The friction locking means adapts the main lever 102 to be locked in any position within its range of movement. Therefore changes of speed ratio may be made in theoretically infinite gradations within the range imposed by the machine design.

At all times during operation of the transmission mechanism liquid lubricant is being forcibly supplied to the inner zones of the races in order to keep the contacting surfaces of the races and rollers well lubricated and cool. Centrifugal force distributes the oil deposited on the inner zones of the raceways. It is vital to the successful operation of transmission mechanisms of this type to maintain a constant and generous supply of lubricant on the traction surfaces of rollers and raceways,—otherwise heating may occur to such a degree as to cause galling or cracking of the surfaces and serious impairment of the mechanism. To secure adequate lubrication it is desirable to direct a constant flow of oil definitely to the raceways at points where it is certain to be applied to the contacting surfaces of rollers and raceways.

Although one particular embodiment of the invention has been described and illustrated it is not intended that the protection afforded shall be limited to the particulars disclosed, but that it shall be limited only by the appended claims.

I claim:

1. In a friction transmission mechanism, a race, a roller adapted to engage one face of the race at varying distances from the race axis, means for holding the roller in tractive engagement with the race, and means for inclining the roller in a plane transverse of the race axis about an axis radially outward from the roller center plane that passes thru the point of contact of the roller with the race.

2. In a friction transmission mechanism, a race, a roller adapted to engage one face of the race at varying distances from the center, roller positioning means including an axle on which the roller may rotate and also move to vary its path of contact with the race, said axle comprising a ratio control lever fulcrumed at a point displaced from the roller center plane including the point of contact with the race in a plane transverse of the axis of the race and capable of an inclining movement.

3. A friction transmission mechanism as defined in claim 2 in which the race is provided with a toric raceway engaged by said roller, said roller being free to tilt about an axis coinciding normally with the center of curvature of the toric raceway in a plane including the axis of rotation of said roller.

4. The combination defined in claim 2 in which the race is provided with a toric raceway, said roller being free to tilt about an axis coinciding normally with the center of curvature of the toric raceway in a plane including the axis of rotation of said roller, and to slide relatively to said ratio control lever.

5. In friction transmission mechanism, a race having a toric raceway; a plurality of equiangularly spaced transmission rollers engaging said raceway; positioning means for the rollers including axles upon which said rollers may rotate to transmit power and tilt to change ratio, said axles comprising ratio control levers inclinable in a plane transverse of the race axis and means to guide the rollers in tilting to change their paths of contact with the raceway; a ratio control lever operating member arranged to rock about the axis of the race, and means connecting said operating member with each of said ratio control levers.

6. In a friction transmission mechanism, a race having a toric raceway, a plurality of angularly spaced rollers engaging said raceway, means for supporting and holding said rollers in tractive engagement with the raceway so that they may rotate on their axes and tilt to change their paths of tractive engagement with the raceway, ratio control levers for the rollers pivoted to the supporting means radially outside of the roller center planes that pass thru the points of contact of the rollers with the race, and extending toward the race axis, an intermediate member connected to each of said ratio control levers adapted to be moved by one ratio control lever in response to excessive torque thereon and effect equalization of torque on all of said rollers.

7. In a friction transmission mechanism, a race having a toric raceway, a plurality of equi-angularly spaced rollers engaging said raceway, positioning members for the rollers including axles upon which the rollers may rotate and which permit said rollers to tilt to change their paths of contact with the raceway, said axles comprising ratio control levers fulcrumed at points displaced from the roller centers in a plane transverse of the axis of the race, a floating control and equalizing member capable of rocking about the race axis and also of moving transversely thereof, said control and equalizing member engaging each of said ratio control levers, and means adapted to rock said control and equalizing member.

8. In a friction transmission mechanism, a race having a toric raceway, a plurality of equi-angularly spaced rollers engaging said raceway, positioning members for the rollers including axles on which the rollers may rotate and which permit said rollers to tilt to change their paths of contact with the raceway, said axles comprising ratio control levers fulcrumed at points displaced from the roller centers in a plane transverse of the axis of the race, a floating equalizing member capable of rocking about the axis of the race and also of moving transversely thereof said equalizing member engaging the ratio control levers, damping means, a coupling means adapted to rotate the equalizing member in any position assumed by the latter, and means for rotating the coupling means.

9. The combination defined in claim 8 in combination with elastic means tending to centralize the equalizing member.

10. The combination defined in claim 8 wherein the means for rotating the coupling means and equalizing member includes centralized and a control member angularly movable around the race axis and the coupling means comprises, a floating neutralizing member, diametrically opposite leaf springs connecting the control member and neutralizing member, and other diametrically opposite leaf springs connecting the neutralizing member and equalizing member, the springs connecting the neutralizing member and equalizing member being disposed 90° from the springs connecting the control member and the neutralizing member.

11. In a friction transmission mechanism, a control mechanism including a floating equalizing member, a control member capable of angular movement about its axis, a floating neutralizing member, leaf springs disposed 180° apart connecting said control member and floating neutralizing member, and other leaf springs disposed 180° apart but 90° from the first named springs connecting the neutralizing member to said floating equalizing member.

12. In a friction transmission mechanism, two races spaced apart in axial alinement, an intermediate race disposed between said two races, at least two intermediate rollers respectively engaging the two races spaced apart and the intermediate race, pivoted equalizing means, means for connecting the equalizing means at one side of its pivot with the roller engaging one raceway of the intermediate race and means for connecting the equalizing means at the other side of its pivot with the roller engaging the opposite raceway of the intermediate race whereby any change in ratio relation of one roller due to torque reaction affects the other.

13. In a friction transmission mechanism, two races and common connecting means compelling them to rotate at the same speed, an intermediate double faced race capable of rotating at a different speed relative to said two races, at least one transmission roller engaging one of said two races and the intermediate race and at least one transmission roller engaging the other of said two races and the intermediate race; a device to incline the axis of each transmission roller; a main control device including an equalizer, a spring biasing said equalizer to a normal position, and separate control trains reacting oppositely on the equalizer extending between said equalizer and the devices for inclining the axes of the rollers.

14. The combination defined in claim 13 in which damping means is associated with the biasing spring.

15. In a friction transmission mechanism, a shaft, a race movable axially thereon, a torque loading device comprising an abutment mounted on the shaft so that it cannot move axially away from the race, said race and abutment being capable of limited angular displacement relatively, means interposed between the race and the abutment adapted to translate the relative angular movement into a movement of the race in an axial direction; and a yieldable pressure device arranged to apply axial pressure to the race independently of the torque loading device, said yieldable pressure device comprising a member surrounding said shaft biased toward the race, and pressure members interposed between said member and race, said pressure members bearing upon the race between the points of application of pressure thereto by the torque loading device.

16. The combination defined in claim 15 in which the yieldable pressure device comprises pins slidable in holes formed in the abutment comprised in the torque loading device.

17. In a friction transmission mechanism, a shaft, a race movable axially and angularly thereon, an abutment fixed on the shaft so that it cannot move axially away from the race or rotate on the shaft, opposed circumferentially separated cam surfaces on the race and abutment, hard rolling bodies interposed between the cam surfaces on race and abutment, said abutment having guide holes between the cam surfaces thereon: a yielding pressure device biased toward the race, pins guided in the holes of the abutment and urged toward the race by said yielding pressure device, and hard rolling bodies disposed between the pins and the race and bearing upon the spaces between the cam surfaces of the race.

18. In a friction transmission mechanism, a shaft, a race movable longitudinally thereon, means to apply yielding pressure to said race comprising an axially movable pressure member, spring means biasing the latter toward the race, slidable pins for transmitting pressure from the axially movable pressure member to the race and a guide member in which said pins slide freely.

19. The combination defined in claim 18 in which the means for transmitting pressure from the axially movable pressure member to the race consists of pins and hard rolling bodies arranged serially between the pressure member and the race, and a guide member for retaining and guiding the pins.

20. In a friction transmission mchanism, the combination of a shaft and a race, a pressure device comprising an abutment, a series of hard rolling bodies between the abutment and the race, a retainer of polygonal contour surrounding the hard rolling bodies, the included circle of which has a diameter less than that of the abutment.

21. In a friction transmission mechanism, a shaft, axially spaced races secured to rotate with the shaft, a tube surrounding the shaft between the races, a race rotatable on the tube between the said spaced races, all of said races having raceways, intermediate rollers engaging said raceways, an inlet for lubricant to the space between the tube and shaft and lubricant distributing devices arranged adjacent each raceway, said distributing devices connecting with the space between the tube and the shaft and having lubricant passages arranged to apply lubricant to the inner portions of the raceways.

22. In a friction transmission mechanism, a driving and driven shaft in axial alinement, oppositely facing races mounted to rotate with one of said shafts, a coaxial intermediate double-faced race rotating with the other shaft, a torque tube upon which said double-faced race is journaled, radial arms projecting from opposite ends of said torque tube, axle elements on said arms, rollers on said axle elements, the treads of said rollers engaging the races, means for securing said torque tube from rotation, a control sleeve within said torque tube, means for moving the control sleeve, and means operated by the control sleeve for controlling the ratio position of the rollers.

23. In friction transmission mechanism, opposed coaxial races; rollers engaging both races; positioning means for the rollers comprising pivoted roller axles, said axles including ratio control levers inclinable in planes transverse of the axis of the races and means to guide the rollers in changing their paths of contact with the races; means for inclining the ratio control levers including a control member angularly movable about the axis of the races, and means for connecting said control member to each ratio control lever.

24. In friction transmission mechanism, coaxial races having toric raceways, rollers intermediate of the raceways, means for maintaining adequate tractive engagement between the treads of the rollers and the raceways, means forcibly to supply lubricant to the contacting surfaces of the raceways and rollers, said means comprising conduits arranged to receive lubricant from a source of supply and having terminal orifices disposed in position to discharge said lubricant onto the inner zones of the raceways.

25. In variable speed friction transmission mechanism, a race, a plurality of equi-angularly spaced rollers adapted to engage the face of said race at varying distances from its center, roller positioning means for supporting the rollers so that their axes, if extended, intersect the axis of the race in the normal position of the rollers during operation, but each capable of yielding under the influence of excessive tangential force applied to one roller to displace its axis so that the extension thereof will pass to one side of the race axis, an equalizing device connecting roller positioning means, and elastic means tending to maintain the equalizing device in a normal position with the roller axes, if extended, intersecting the axis of the race.

26. In variable speed friction transmission mechanism, a race, a plurality of equi-angularly spaced rollers adapted to engage the face of said race at varying distances from its center, roller positioning means for supporting the rollers so that their axes, if extended, intersect the axis of the race in the normal position of the rollers during operation, but each capable of yielding under the influence of excessive tangential force applied to one roller to displace its axis so that the extension thereof will pass to one side of the race axis, an equalizing device connecting roller positioning means, and damping means cooperating with the equalizing device.

27. In a variable speed friction transmission mechanism, two axially alined end races connected to rotate in unison and an intermediate race rotatable independently of and axially alined between the other two, said races having toroidal raceways; two series of power transmitting rollers respectively disposed between the intermediate race and the respective end races; means for supporting the rollers so that their axes, if extended, intersect the axis of the races in the normal position of the rollers, said supporting means being constructed and arranged to guide the rollers while changing their ratio position with respect to the races, and including ratio control devices operative to displace the roller axis so that extensions thereof will pass to one side of the race axis; two floating equalizing rings, disposed normally concentrically with respect to the races, operative connections between one equalizing ring and the ratio control devices of one series of rollers, and operative connections between the other equalizing ring and the ratio control devices of the other series of rollers; and external operating means including a pivoted equalizer having operative connections extending from one side of its pivot to one of the floating equalizing rings and from the other side of its pivot to the other floating equalizing ring.

28. In a variable speed friction transmission mechanism, two races spaced apart in axial alinement, an intermediate race disposed between said two races, at least two intermediate rollers respectively engaging the two races spaced apart and the intermediate race, and movable to different ratio positions, roller supporting means movable during ratio changing movement of the rollers, a fixedly pivoted equalizer, connecting means between the equalizer at one side of its pivot to the roller supporting means at one side of the intermediate race, and other connecting means between the equalizer at the other side of its pivot and the roller supporting means at the other side of the intermediate race, whereby any change in ratio relation of one roller due to torque reaction affects the other end.

JACOB EHRLICH.